V. CLAIREMONT.
APPARATUS FOR PRESERVING EGGS.
APPLICATION FILED MAR. 10, 1920.
1,369,323.
Patented Feb. 22, 1921.
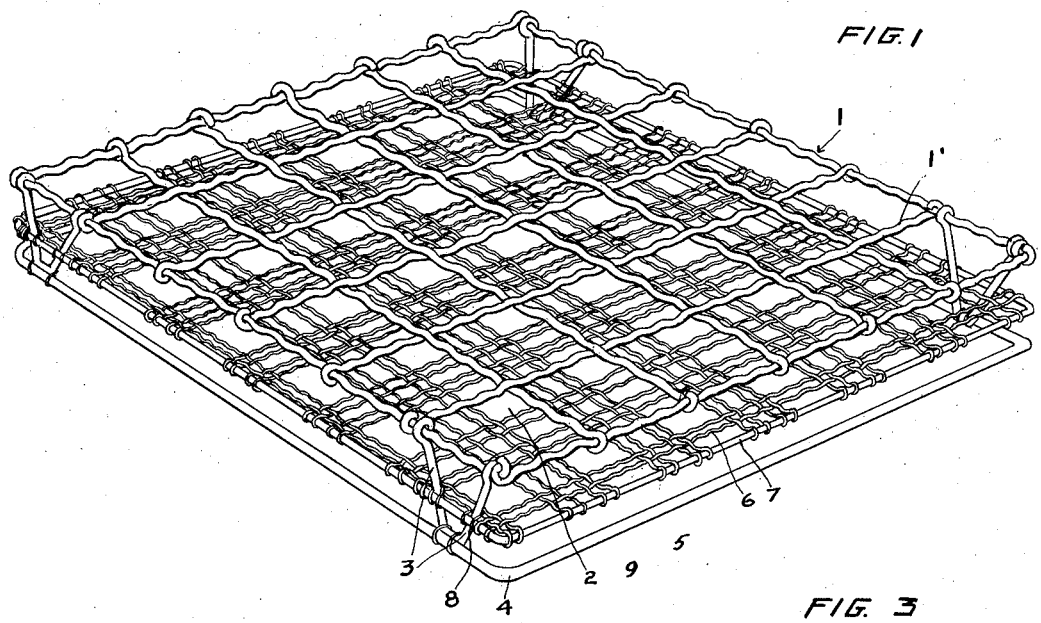
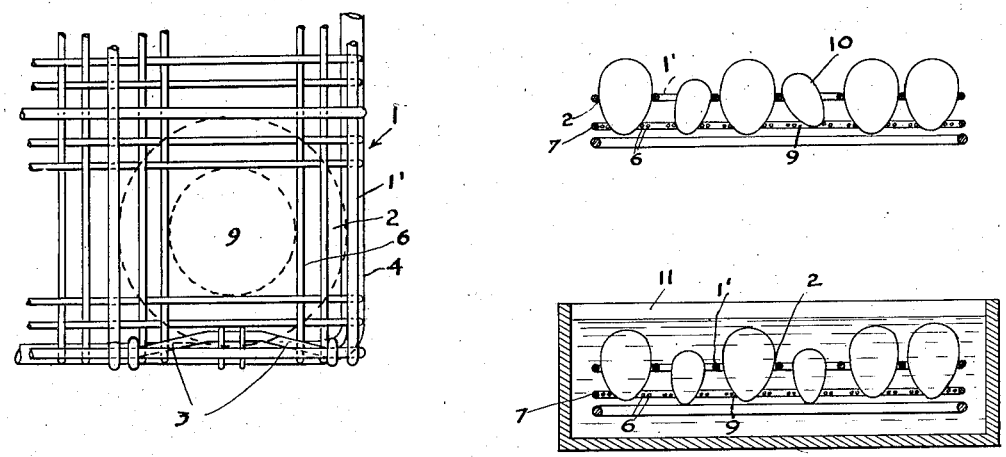
FIG. 2
FIG. 4
INVENTOR
V. CLAIREMONT
ATT'YS.

UNITED STATES PATENT OFFICE.

VICTOR CLAIREMONT, OF SAN FRANCISCO, CALIFORNIA.

APPARATUS FOR PRESERVING EGGS.

1,369,323.  Specification of Letters Patent.  Patented Feb. 22, 1921.

Application filed March 10, 1920. Serial No. 364,797.

*To all whom it may concern:*

Be it known that I, VICTOR CLAIREMONT, a citizen of the United States, residing at San Francisco, in the county of San Francisco and State of California, have invented new and useful Improvements in Apparatus for Preserving Eggs, of which the following is a specification.

This invention relates to an egg preserving apparatus and more particularly to a novel support in the form of a tray or basket for supporting eggs to be dipped in a preserving solution.

The primary object of the invention is to provide a tray or basket of the character described in which eggs regardless of size will be supported in such manner that when the tray containing the eggs is dipped into a preserving solution, the eggs will float clear of the tray or basket and then settle back into the proper positions of support when the basket is lifted, with the result that the entire area of each egg is subjected to the action of the preserving fluid and all of the moisture between the skins and shells will be driven out and the pores of the shells thoroughly sealed by the solution.

Another object of the invention is to provide a light, inexpensive, basket of the character described, which may be handled with ease and facility.

The invention possesses other advantages and features, some of which, with the foregoing will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Referring to the drawings:

Figure 1 is a perspective view of my improved basket.

Fig. 2 is a fragmentary top plan view of the basket showing in dotted lines an egg supported therein.

Fig. 3 is a cross sectional view of the basket showing the eggs supported therein.

Fig. 4 is a sectional view taken through the basket and a tank in which the preserving solution is contained, the eggs being shown immersed in the solution and spaced from the basket.

In carrying out my invention, I provide a basket having a plurality of egg receiving and supporting openings, which openings are of irregular outline and of such character that when the eggs are supported therein, the openings are not fully closed and permit the preserving solution to pass therethrough and around the eggs. One way of carrying out this particular formation of the openings is to make the openings of such shape that their greatest diameters exceed the greatest transverse diameters of the eggs. The basket is formed of two superposed supporting surfaces, both of which are provided with openings such as herein mentioned, said openings being of corresponding shapes, but of different sizes. The lower supporting surface supports the lower ends of the eggs, whereas the upper supporting surface supports or contacts with the intermediate portions of the eggs, as shown in Fig. 3 of the drawing. These supporting surfaces are spaced apart sufficiently to properly support the egg, but not to such an extent that a small egg could in any way fall or work in between the surfaces and be caught or wedged therein.

Referring specifically to the present embodiment of the invention as illustrated in the drawings, the basket comprises an upper supporting surface 1 preferably formed of woven wire 1' and arranged so as to provide a series of preferably square egg receiving and supporting openings 2, the wire being preferably twisted or corrugated so as to provide strength and rigidity. The supporting surface is preferably of a size to support three dozen eggs, this number being that of a unit of eggs such as ordinarily packed in fillers in a case of eggs. The upper supporting surface is joined by arms 3 at the corners thereof to a preferably square frame 4 of heavy wire which frame acts as a support for the surface 1. Fixed to the arms 3 is a lower supporting surface formed of woven wire 6 lighter and smaller than the wire of the supporting surface 1. The wire 6 is connected with a square heavy wire frame 7, the latter being secured, as at 8, to the arms 3. The wire 6 is interwoven so as to provide a series of preferably square egg receiving openings 9 corresponding in number to the openings 2 and arranged in line with said latter openings, The openings 6 are considerably smaller than the openings 2 and are adapted to receive the lower ends of the eggs, as shown in Fig. 3. By making the openings 2 and 6 square, the eggs do not completely close said openings and when the basket with the eggs thereon is immersed in the solution, the solution will readily pass through the openings and around the eggs, with the result that the eggs will more readily float free from contact with the basket and not be liable to stick thereto. The supporting surfaces 1 and 2 are spaced, one above the other, a distance sufficient to permit of an egg being supported in substantially upright position but so as to prevent a small egg such as the one 10 shown in Fig. 3 of the drawings from falling or working in between the supporting surfaces and sticking in such position.

In Fig. 4 of the drawings, I have shown a tank or receptacle 11 in which a suitable preserving solution is contained and in which the tray of my invention with the eggs supported thereon is placed so as to immerse the eggs in the solution.

While I have shown the tray or basket provided with square openings, I do not wish to limit myself to the use of openings of this shape, inasmuch as it is apparent that I may make the openings of various other shapes so long as said openings have a greater diameter in excess of the greatest transverse diameter of the eggs. On the other hand, by forming the basket of wire and providing the square holes provision is made for supporting three dozen or any given number of eggs within an area considerably less than that required with the basket made of sheet metal provided with openings therein or otherwise formed. In this way, I provide for a very compact, small basket, having minimum area whereby when the basket with the eggs is dipped in the solution, the solution will not be obstructed materially and will readily immerse the eggs.

I claim:

1. Means for supporting eggs to be dipped in a preserving solution, comprising a surface provided with a plurality of egg receiving openings, the greatest diameters of which openings normally exceed the greatest transverse diameters of the eggs supported in the openings.

2. A basket of the character described, comprising a lower supporting surface, an upper supporting surface joined to, and spaced from, the lower surface, said surfaces having egg receiving openings therein.

3. A basket of the character described comprising a lower supporting surface, and an upper supporting surface spaced from the lower surface a distance whereby large and small eggs will both contact with and extend above the upper surface and small eggs be prevented from falling between said surfaces.

4. A basket of the character described comprising superposed egg supporting surfaces joined to one another, said surfaces having a plurality of alined angular egg receiving openings therein, the lowermost of which openings are smaller than the uppermost.

5. A basket of the character described comprising superposed supporting surfaces joined to one another and spaced $\tfrac{13}{16}$ of an inch from each other, said surfaces having egg receiving openings therein.

6. A basket of the character described comprising superposed egg supporting surfaces joined to one another said surfaces having a plurality of alined angular egg receiving openings therein, the lowermost of which openings are smaller than the uppermost, and a supporting frame extending below and secured to said surfaces.

VICTOR CLAIREMONT.